United States Patent
Laubner et al.

(10) Patent No.: US 6,885,663 B2
(45) Date of Patent: Apr. 26, 2005

(54) TIME/SPACE SWITCHING COMPONENT WITH MULTIPLE FUNCTIONALITY

(75) Inventors: Karsten Laubner, Munich (DE); Marcel-Abraham Troost, Munich (DE)

(73) Assignee: Siemens Aktiengesellschaft, Munich (DE)

(*) Notice: Subject to any disclaimer, the term of this patent is extended or adjusted under 35 U.S.C. 154(b) by 823 days.

(21) Appl. No.: 09/739,311

(22) Filed: Dec. 18, 2000

(65) Prior Publication Data

US 2001/0017859 A1 Aug. 30, 2001

(30) Foreign Application Priority Data

Dec. 17, 1999 (DE) .......................................... 199 61 132

(51) Int. Cl.[7] .............................................. H04Q 11/00
(52) U.S. Cl. ...................... 370/369; 370/370; 370/371; 370/372; 370/375; 370/376; 370/380; 340/2.21; 379/271; 379/272
(58) Field of Search ................................. 370/369–372, 370/375, 376, 380, 386, 388, 216–221, 225, 244, 395; 340/2.1, 2.2, 2.21; 379/271, 272

(56) References Cited

U.S. PATENT DOCUMENTS

| | | | | |
|---|---|---|---|---|
| 3,851,105 A | * | 11/1974 | Regnier et al. | ............. 370/371 |
| 3,909,562 A | * | 9/1975 | Lager | .......................... 370/250 |
| 4,455,645 A | * | 6/1984 | Mijioka et al. | ............. 370/220 |
| 4,845,704 A | * | 7/1989 | Georgiou et al. | ........... 370/380 |
| 5,390,178 A | * | 2/1995 | Hunter | ........................ 370/370 |
| 5,671,213 A | * | 9/1997 | Kurano | ........................ 370/218 |
| 5,987,027 A | | 11/1999 | Park et al. | |
| 6,240,063 B1 | * | 5/2001 | Suzuki | ........................ 370/217 |
| 6,330,237 B1 | * | 12/2001 | Suda et al. | .................. 370/369 |
| 6,430,180 B1 | * | 8/2002 | Bohm et al. | ................. 370/369 |
| 6,611,519 B1 | * | 8/2003 | Howe | .......................... 370/386 |
| 6,639,920 B1 | * | 10/2003 | Sakurai et al. | .............. 370/471 |

FOREIGN PATENT DOCUMENTS

EP        0 558 291 A2    9/1993

* cited by examiner

*Primary Examiner*—Alpus H. Hsu
*Assistant Examiner*—Clemence Han
(74) *Attorney, Agent, or Firm*—Morrison & Foerster LLP

(57) ABSTRACT

A time/space switching component is provided with multiple functionality that includes a time switching unit, of a space switching unit of a data channel sequence correction unit and of a control unit. As a result of corresponding mode selection, the different functionalities for a switching network are obtained with a single component, resulting in a significant reduction in an overall expenditure for development and manufacture.

12 Claims, 6 Drawing Sheets

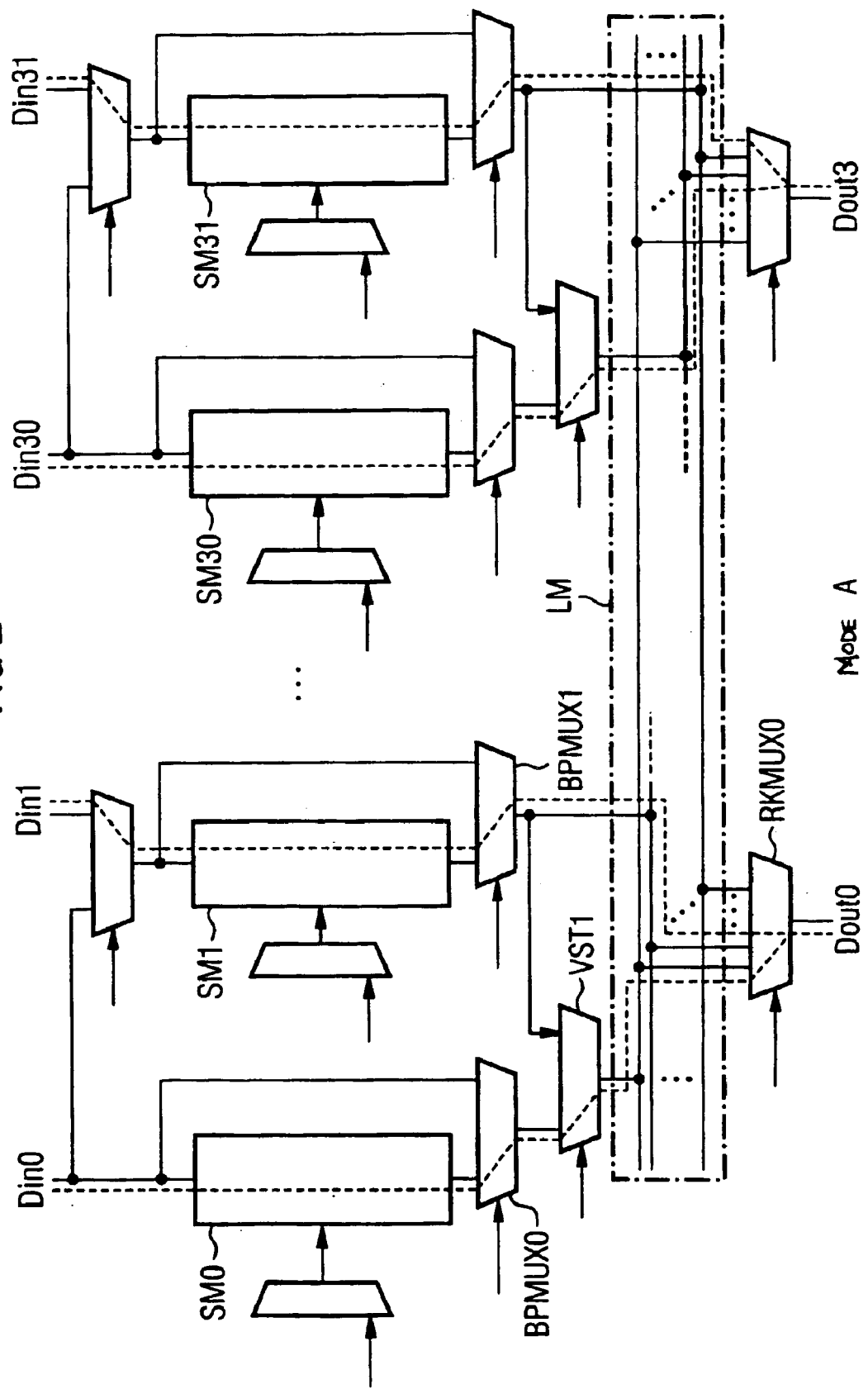

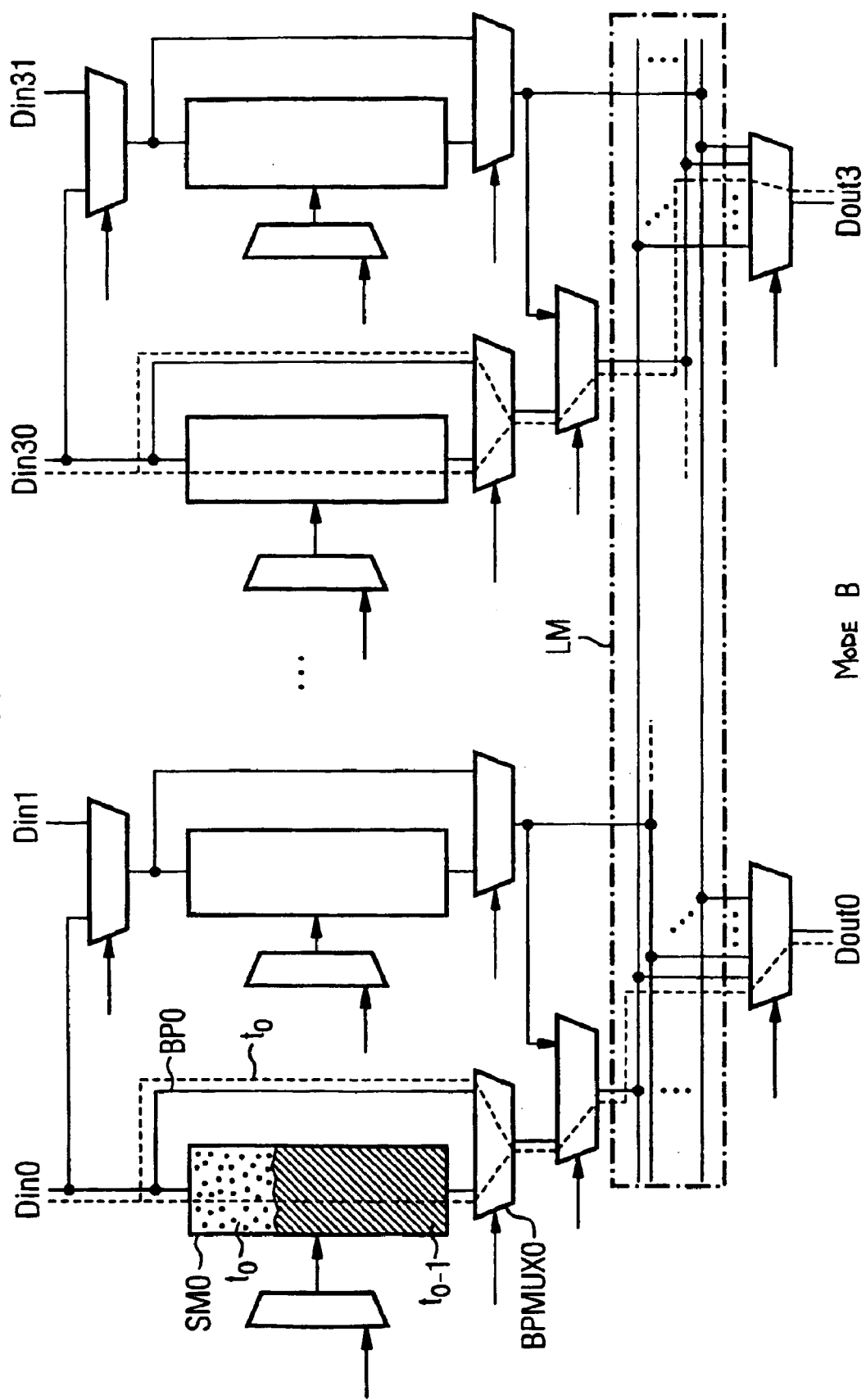

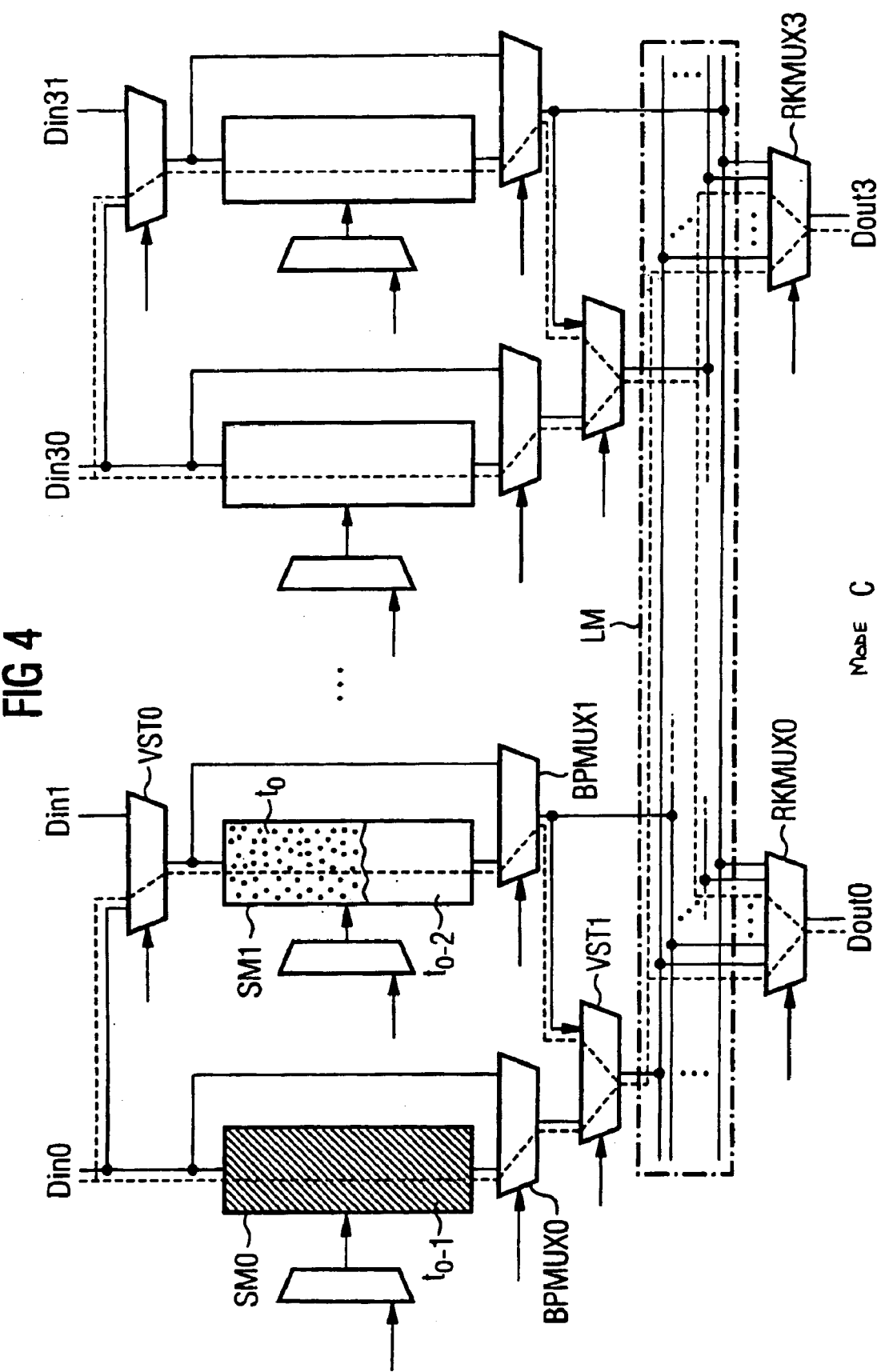

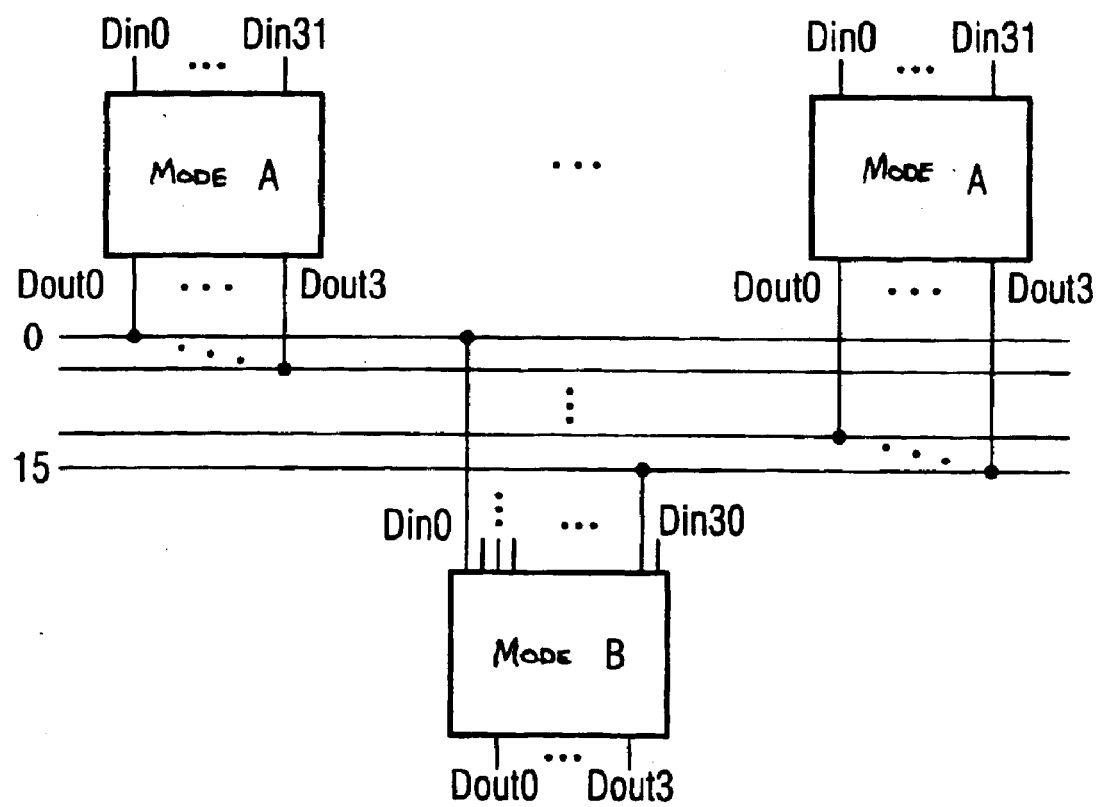

FIG 6 relative Test Channel - Address In The Respective Block

| Block | 0 | 1 | 2 | 3 | 4 | 8 | 16 | 17 | 18 | 32 | 64 | 65 | 66 | 67 | 68 | 127 |
|---|---|---|---|---|---|---|---|---|---|---|---|---|---|---|---|---|
| 0 | syn0 | syn1 | syn2 | syn3 | asw0 | asw1 | asw2 | tstch | tstch | asw3 | asw4 | tstch | tstch | tstch | tstch | tstch |
| 1 | asw5 | tstch | tstch | tstch | tstch | tstch | tstch | payld | payld | tstch | tstch | tstch | tstch | tstch | tstch | tstch |
| 2 | asw6 | tstch | tstch | tstch | tstch | tstch | tstch | payld | payld | tstch | tstch | tstch | tstch | tstch | tstch | tstch |
| 3 | tstch | tstch | tstch | tstch | tstch | tstch | tstch | payld | payld | tstch | tstch | tstch | tstch | tstch | tstch | tstch |
| 4 | asw7 | tstch | tstch | tstch | tstch | tstch | tstch | payld | payld | tstch | tstch | tstch | tstch | tstch | tstch | tstch |
| 5 | tstch | tstch | tstch | tstch | tstch | tstch | tstch | payld | payld | tstch | tstch | tstch | tstch | tstch | tstch | tstch |
| 6 | tstch | tstch | tstch | tstch | tstch | tstch | tstch | payld | payld | tstch | tstch | tstch | tstch | tstch | tstch | tstch |
| 7 | tstch | tstch | tstch | tstch | tstch | tstch | tstch | payld | payld | tstch | tstch | tstch | tstch | tstch | tstch | tstch |
| 8 | asw8 | tstch | tstch | tstch | tstch | tstch | tstch | payld | payld | tstch | tstch | tstch | tstch | tstch | tstch | tstch |
| 9 | tstch | tstch | tstch | tstch | tstch | tstch | tstch | payld | payld | tstch | tstch | tstch | tstch | tstch | tstch | tstch |
| 10 | tstch | tstch | tstch | tstch | tstch | tstch | tstch | payld | payld | tstch | tstch | tstch | tstch | tstch | tstch | tstch |
| 11 | tstch | tstch | tstch | tstch | tstch | tstch | tstch | payld | payld | tstch | tstch | tstch | tstch | tstch | tstch | tstch |
| 12 | tstch | tstch | tstch | tstch | tstch | tstch | tstch | payld | payld | tstch | tstch | tstch | tstch | tstch | tstch | tstch |
| 13 | tstch | tstch | tstch | tstch | tstch | tstch | tstch | payld | payld | tstch | tstch | tstch | tstch | tstch | tstch | tstch |
| 14 | tstch | tstch | tstch | tstch | tstch | tstch | tstch | payld | payld | tstch | tstch | tstch | tstch | tstch | tstch | tstch |
| 15 | tstch | tstch | tstch | tstch | tstch | tstch | tstch | payld | payld | tstch | tstch | tstch | tstch | tstch | tstch | tstch |
| 16 | asw9 | tstch | tstch | tstch | tstch | tstch | tstch | payld | payld | tstch | tstch | tstch | tstch | tstch | tstch | tstch |
| 17 | tstch | tstch | tstch | tstch | tstch | tstch | tstch | payld | payld | tstch | tstch | tstch | tstch | tstch | tstch | tstch |

# TIME/SPACE SWITCHING COMPONENT WITH MULTIPLE FUNCTIONALITY

BACKGROUND OF THE INVENTION

1. Field of the Invention

The present invention is directed to a time/space switching component with multiple functionality and, in particular, to a time/space switching component as employed for realizing a switching network in a telecommunication switching system.

2. Description of the Related Art

In a telecommunication switching system, an actual switching or physical coupling of data channels to be switched fundamentally occurs in a switching network. Such a switching network as employed, for example, in the type B switching network of the Siemens EWSD system, is usually composed of a time switching network for the time allocation of the data channels to be switched and of a space switching network for the spatial allocation of the data channels to be switched. The time switching network as well as the space switching network are connected to one another via switching network lines in the switching network.

Furthermore, for switching networks (particularly in the time switching networks within), it is necessary to correct a data channel sequence or time slot sequence (TSSI, time slot sequence integrity). Specifically, a constellation can occur, in particular, in the time allocation of interrelated data channels within a time-division multiplex system resulting in the time sequence of data contents being transposed by one frame, i.e., a modified data channel sequence $D(t_0)$, $D(t_{0-2})$, $D(t_{0-1})$ arises from an original data sequence $D(t_0)$, $D(t_{0-1})$, $D(t_{0-2})$ due to the switching algorithm of the time or space switching stages after allocation of the data channels. In order to correct such a modified data channel sequence, accordingly, further components must be employed in the switching network.

Additionally, switching networks having a corresponding small, medium or very large capacity are needed for realizing small, medium or large telecommunication switching systems. Usually, a plurality of different modules or components that are respectively adapted to the corresponding demands are employed in traditional switching networks for realizing these very different switching capacities as well as for the correction of the data channel transpositions occurring within. Due to a relatively low number of units, however, the employment of such a great plurality of different modules or components is cost-intensive. In the same way, the development costs for a switching network are increased due to the employment of this plurality of different modules or components.

SUMMARY OF THE INVENTION

The invention is therefore based on the object of creating a time/space switching component with multiple functionality with which all essential functions of a switching network from very low to very high switching capacity can be realized.

This object is inventively achieved by a time/space switching component with multiple functionality comprising: a time switching unit for a time allocation of a plurality of data channels; a space switching unit for a space allocation of the plurality of data channels; a data channel sequence correction unit correcting a time sequence of the plurality of data channels; and a control unit driving the time switching unit, the space switching unit and/or the data channel sequence correction unit dependent on a selected operating mode.

Particularly due to the construction of a time/space switching component with a time switching unit, a space switching unit and a data channel sequence correction unit that can be respectively driven by a control unit for setting a respective operating mode, one obtains a switching component with multiple functionality that can be utilized both in very small as well as in very large switching systems and that can be cost-beneficially manufactured due to the greater number of units. Accordingly, a generic switching component is obtained with a plurality of operating modes in that the units located within—dependent on operating mode—can be connected into a data path that produces a respectively required functionality. This reduces the expenditure for the development of a plurality of different modules or components, particularly when constructing a new switching network.

Advantageous developments of the invention include having the time switching unit comprise N memory devices for storing the plurality of data channels of a time frame in a plurality of memory cells; and N address selection stages (which may be multiplexers) for a selective drive of the plurality of memory cells. The space coupling unit may comprise a line matrix with N×(N×M) connecting lines; and M space switching selection stages (which may be multiplexers) for a selection of one of the N connecting lines dependent on the control unit. Furthermore, the data channel sequence correction unit may comprise N bypass lines for respectively bypassing the N memory devices; N bypass selection stages (which may be multiplexers) for a selective selection of either the bypass lines or the memory devices; and N connection selection stages for a selective, paired connection of the N memory devices to their appertaining bypass lines and for a selective selection of the memory devices with bypass lines connected in pairs dependent on the control unit The N connection selection stage may comprise N/2 input multiplexers, and N/2 output multiplexers. The control unit may be chosen to comprise M control stages. The N connection selection stages and the N bypass selection stages may be deactivated in an embodiment, or the N bypass selection stages may be activated while the N connection stages are deactivated (or visa versa).

In an embodiment of the invention, the time/space switching component has the control unit driving the time switching unit, the space switching unit and/or the data channel sequence correction units such that, in a first operating mode, a time and space allocation of the plurality of data channels of N input lines onto M output lines occurs, or in a second operating mode such that a correction of a data channel sequence and a space allocation of the plurality of data channels occurs from N input lines onto M output lines, or in a third operating mode such that a correction of the data channel sequence as well as a time and space allocation of the plurality of data channels occurs from N/2 input lines onto M output lines.

BRIEF DESCRIPTION OF THE DRAWINGS

The invention is explained in greater detail below on the basis of exemplary embodiments with reference to the following drawings.

FIG. 2 is a simplified block illustration of the inventive time/space switching component in an operating mode A;

FIG. 3 is a simplified block illustration of the inventive time/space switching component in an operating mode B;

FIG. 4 is a simplified block illustration of the inventive time/space switching component in an operating mode C;

FIG. 5 is a simplified block illustration for the realization of a switching network functionality by combination of the inventive time/space switching components in different operating modes; and FIG. 6 is a simplified chart illustrating a frame structure employed by the inventive time/space switching component.

DESCRIPTION OF THE PREFERRED EMBODIMENTS

Figure 1:
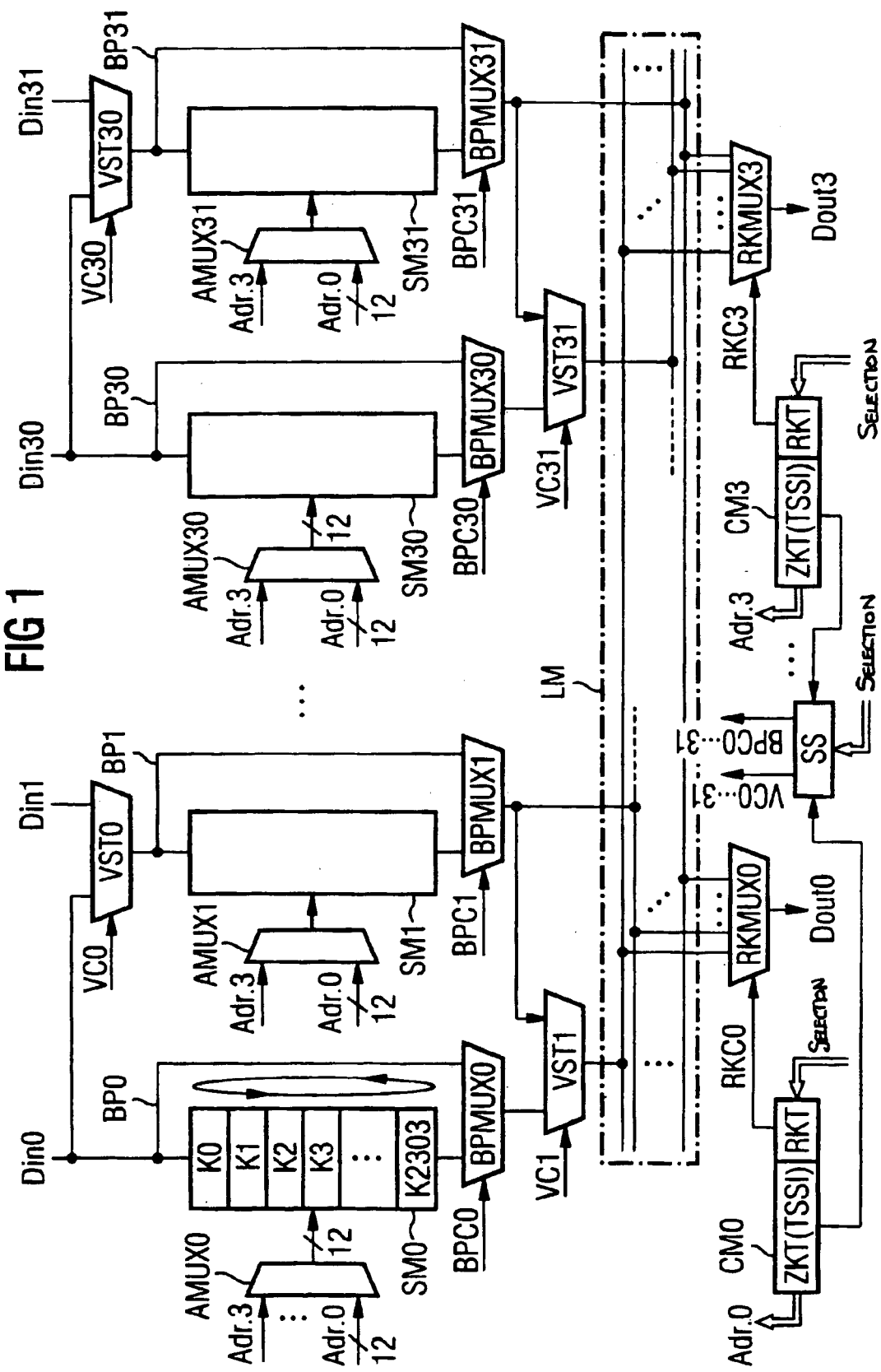
FIG. 1 is a simplified block illustration of the inventive time/space switching component with multiple functionality.

FIG. 1 is a simplified block illustration of the inventive time/space switching component with multiple functionality, as a result of which a time and/or space allocation of data channels in up to 32 input lines Din0 through Din31 onto up to 4 output lines Dout0 through Dout3 is essentially enabled. Such an N/M time/space switching component with, for example, N=32 and M=4 thus enables the realization of all essential functionalities in a switching network, which is described in detail below.

For illustrating the functioning of, in particular, a time switching unit, an exemplary frame structure as preferably employed by the inventive time/space switching component with multiple functionality is described first.

FIG. 6 is a simplified chart illustrating the frame structure as adjacent, for example, at the input lines Din0 through Din31 and at the output lines Dout0 through Dout3. According to FIG. 6, data streams, for example, of approximately 184 Mbit/s are switched, the data streams comprising test channels tstch, syn, asw (for a total of 2×128 data channels) and payload channels payld (for a total of 16×128×data channels). FIG. 6 only shows an excerpt of the overall frame structure (a total of 2304 data channels), in which, particularly, the relative channel addresses 5 through 7, 9 through 15, 19 through 31, 33 through 63 and 69 through 126 are not shown for the sake of simplifying the frame structure. Further payload channels are transmitted in the time/space switching component via these further, relative channel addresses of the synchronous time-division multiplex frame.

According to FIG. 6, the synchronous time-division multiplex frame contains 16×128 payload channels as transmitted, for example, by 16 line groups (not shown) and generated by a multiplexer network or a concentrator network (neither shown). Due to this 16-fold compression of the data quantity of 128 data channels usually transmitted by the line groups, a data volume of 2304 data channels per time frame and data line to be switched by the time/space switching component derives.

Returning to FIG. 1, the inventive time/space switching component with multiple functionality accordingly preferably comprises 32 memory devices SM0 through SM31 with respectively 2304 memory cells K0 through K2303 each, in which the information of a complete time frame—as described above—can be deposited. The memory cells K0 through K2303 preferably comprise a data width of 10 bits, with 8 bits comprising the payload data and 2 bits comprising check data.

Each of the 32 memory devices SM0 through SM31, which are usually referred to as speech memories, enables a continuous write-in of data as well as a selective readout of data from the respective data cells K0 through K2303, resulting in a realization of an essentially time allocation of the data channels into the various time slots of a synchronous time-division multiplex system. The memory devices SM0 through SM31 in common with 32 address selection stages AMUX0 through AMUX31, accordingly, realize a time switching unit of the time/space switching component. The 32 address selection stages AMUX0 through AMUX31 are preferably realized by address multiplexers at whose input respectively 4 address busses Adr0 through Adr3 are adjacent with respectively 12 bits for the selective drive of the memory devices SM0 through SM31.

For driving the address busses Adr0 through Adr3, the time/space switching component preferably has 4 control memories CM0 through CM3 that form a control unit in common with a control stage SS and, dependent on a mode selection input to it, assumes the control of the time switching unit or of the plurality of memory devices SM0 through SM31. In this way, a time allocation of all data channels shown in the frame structure according to FIG. 6 can be realized, where, in particular, the payload channels payld experience a time allocation.

For spatial allocation, the time/space switching component preferably has a line matrix LM with 32×32 connecting lines or busses that are respectively connected to 4 space switching selection stages RKMUX0 through RKMUX3. The 4 space switching selection stages RKMUX0 through RKMUX3 are composed, for example, of 32 multiplexers with 32 inputs and an output and are driven via appertaining space switching control lines RKC0 through RKC3, again by the 4 appertaining control memories CM0 through CM3 of the control unit, such that a spatial allocation of the data channels in the 32 input lines Din0 through Din31 to the 4 output lines Dout0 through Dout3 derives. The drive of the space switching selection stages RKMUX0 through RKMUX3 is likewise dependent on a mode selection adjacent at the control unit.

In addition to the time switching unit and space switching unit needed for the time and space allocation, the inventive time/space switching component also has a data channel sequence correction unit that is essentially composed of 32 bypass lines BP0 through BP31 for the respective bridging of the 32 memory devices SM0 through SM31 as well as of 32 bypass selection stages BPMUX0 through BPMUX31 for the selective selection of the respective bypass lines BP0 through BP31.

According to FIG. 1, the data channel sequence correction unit is driven by a plurality of data channel sequence correction control lines BPC0 through BPC31 that are respectively adjacent at the appertaining bypass selection stages BPMUX0 through BPMUX31. The signals for the data channel sequence correction control lines BPC0 through BPC31 are in turn generated by the control unit or the control stage SS dependent on a mode selection and on the control memories CM0 through CM3.

The control unit or the control memory CM0 through CM3 and the control stage SS, accordingly, can be divided into a time switching part ZKT and a space switching part RKT, where the signals for the data channel sequence correction control lines BPC0 through BPC31 are allocated to the time switching part ZKT and essentially serve for a correction of the data channel sequence or of the time slot sequence (TSSI, time slot sequence integrity).

Furthermore, the inventive time/space switching component with multiple functionality has 32 connection selection stages VST0 through VST31 for the selective, paired connection of the 32 memory devices SM0 through SM31 (with their appertaining bypass lines BP0 through BP31) and for the selective selection of the memory devices connected in pairs (with bypass lines) dependent on the control unit or on the mode selection pending at it. Stated more precisely, an input line Din0, Din2, . . . Din30 can be connected via a respective connection control line VC0, VC2, . . . VC30 and its appertaining connection selection stage VST0, VST2, . . . VST30 to a neighboring input line Din1, Din3, . . . Din31 or the data stream pending in the respective input lines can be redirected to the neighboring memory devices SM1, SM3, . . . SM31 over it. In the opposite direction, this redirected data stream can in turn be subsequently merged by the further connection selection stages VST1, VST3, . . . through VST31 dependent on the control signals adjacent at the appertaining connection control lines VC1, VC3, . . . VC31. In this way, a data channel sequence correction or check of a correct time slot sequence (TSSI) can be alternatively realized, as described in greater detail below.

The invention is described in detail below on the basis of the various operating modes.

Operating Mode A

FIG. 2 shows a simplified block illustration of the inventive time/space switching component in an operating mode A, where only critical parts are shown or provided with reference characters for improving the clarity.

In the operating mode A according to FIG. 2, a time allocation as well as a space allocation of a data channel to be switched is essentially realized, whereas a correction of the data channel sequence (TSSI) is not implemented. To this end, for example, a data stream (broken line) supplied via the input line Din0 is supplied to the memory device SM0, where the time allocation essentially occurs. Subsequently, it is supplied via the bypass selection stage BPMUX0 and the connection selection stage VST1 to the line matrix LM and, given a corresponding drive via, for example, the space switching selection stage RKMUX0, is output to the output line Dout0.

In the same way, a data stream (broken line) input at the input line Din1 is supplied to the memory device SM1 and, via the bypass selection stage BPMUX1, to the line matrix LM in which, given a corresponding drive via the space switching selection stage RKMUX0, the data stream is in turn supplied to the output line Dout0. A comparable space and time allocation of data channels essentially ensues in the other time/space switching stages. In this way, the time/space switching component works only a switching stage with time and space switching functionality.

Operating Mode B

FIG. 3 shows a simplified block illustration of the inventive time/space switching component with multiple functionality in an operating mode B. In this operating mode, the time/space switching component only enables a data channel sequence correction (TSSI) as well as a spatial allocation of the data channels. In contrast to the operating mode A according to FIG. 2, however, no time allocation is possible here.

FIG. 3 essentially corresponds to the illustration according to FIG. 1, providing only the relevant elements with reference characters for the sake of clarity.

According to FIG. 3, a data stream (broken line) input at the input line Din0 is supplied either to the memory device SM0 or to the bypass line BP0, where the selection of the respective path occurs via the bypass selection stage BPMUX0. In this way, a correction of the data channel sequence or time slot sequence can be realized given a corresponding drive of the bypass selection stage BPMUX0. Stated more precisely, a data stream is continuously written into the memory device SM0, in which, for example, an upper part $t_0$ (dotted area) shows the data channels of a current time frame at the time $t_0$, whereas the data channels deposited in a lower part $t_{0-1}$ (shaded area) belong to an earlier time frame at time $t_{0-1}$.

When, due to preceding switching events, a transposition has occurred in the data channel sequence, then this can be compensated given a corresponding drive of the bypass selection stage BPMUX0. In this case, a data channel that should actually lie in a time frame at the time $t_{0-1}$ but is momentarily located in the time frame at time $t_0$ can be returned into its original time frame via the bypass line BP0. The further data path corresponds to that of operating mode A (see above). Thus, according to FIG. 3, a correction of the data channel sequence is obtained for all 32 input lines Din0 through Din31.

Operating Mode C

FIG. 4 shows a simplified block illustration of the inventive time/space coupling component with multiple functionality in an operating mode C, where only critical elements are again shown or provided with reference characters for the sake of clarity.

In the operating mode C according to FIG. 4, both a time and space allocation as well as a data channel sequence correction are realized in the time/space switching component. In contrast to the above-described operating modes A and B, a time/space switching component with reduced capacity is obtained. Stated more precisely, the time/space switching component in operating mode C has a switching capacity of only (1/2*N)/M (for example, 16/4), i.e., 16 input lines Din0, Din2, . . . Din30 can be switched onto 4 output lines Dout0 through Dout3.

A data stream (broken line) supplied at the input line Din0 can be supplied either to the memory device SM0 or the memory device SM1, where the selection occurs via the connection selection stages VST0 and VST1. Even though the bypass selection stages BPMUX0 and BPMUX2 are deactivated, a correction of the data channel sequence is thereby enabled.

A time allocation can in turn be implemented, for example, with the memory device SM0. A space allocation of the data channels in turn essentially derives from the line matrix LM and the appertaining space switching stages RKMUX0 through RKMUX3. The realization of the data channel sequence correction unit, however, now occurs by the combinatorial selection of the memory devices SM0 and SM1 in conjunction with their appertaining connection selection stages VST0 and VST1. Stated more precisely, it is particularly the connection selection stage VST0 and VST1 that is driven given a data channel sequence to be corrected such that, for example, an incorrectly deposited data channel in the memory SM0 for a time frame at the time $t_{0-1}$ is replaced by a data channel deposited in the memory SM1 for a time frame $t_{0-2}$. In this way, a correction of a faulty data channel sequence can in turn be realized, where, however, the bypass lines BP0 and BP1 are not employed, and, consequently, a time allocation can continue to be implemented, for example, in the memory SM0. The single limitation in the employment of this operating mode C is the fact that the input lines Din1, Din3, . . . Din31 cannot be used, thus producing a reduced switching capacity of, for example, 16/4.

FIG. 5 shows a simplified block illustration for the use of the above-described time/space switching components with multiple functionality, in which the components are operated in different operating modes. According to FIG. 5, a plurality of time/space switching components in a first stage are in an operating mode A, thus implementing a time and space allocation. The arrangement shown in FIG. 5 realizes a switching network or module of 128/4. Stated more precisely, 4 time/space switching components in an operating mode A are arranged in parallel in a first stage, where their total of 16 output lines are supplied to the respective 16 input lines of a time/space switching component in an operating mode B. The time/space switching component in the operating mode B merely implements a correction of the data channel sequence.

In this way, a 128/4 switching network is obtained by using the operating modes A and B. However, a multitude of other combination possibilities are possible with the inventive time/space switching component, which a person skilled in the art can easily realize—hence a detailed description is not provided.

The above invention was described on the basis of a 32/4 time/space switching component with 32 input lines and 4 output lines. However, it is not limited thereto and, on the contrary, covers all further time/space switching components with a plurality of input and output lines deviating from this configuration. The time/space switching component is preferably realized as an ASIC (application specific integrated circuit).

In the same way, a frame structure deviating from the above-described frame structure with 2034 data channels can be employed.

The above-described time/space switching component is illustrative of the principles of the present invention. Numerous modifications and adaptations thereof will be readily apparent to those skilled in this art without departing from the spirit and scope of the present invention.

What is claimed is:

1. A time/space coupling component with multiple functionality, comprising:

space coupling unit for spatial allocation of a plurality of data channels;

a time coupling unit for chronological allocation of the plurality of data channels, with N memory devices for storing the plurality of data channels of a time frame in a plurality of memory cells and N address selection stages for selectively controlling the plurality of memory cells;

a data channel sequence correction unit with N bridging lines for bridging each of the N memory devices and N bridging selection stages for selective selection of the bridging lines or the memory devices for correction of the chronological sequence of the plurality of data channels; and a control unit for controlling the time coupling unit, the space coupling unit and/or the data channel sequence correction unit in dependent on a selected operating mode.

2. The time/space coupling component according to claim 1, wherein the space coupling unit comprises:

a line matrix with N X (N X M) connection lines, and

M space coupling selection stages for selection of one of the N connection lines dependent on the control unit.

3. The time/space coupling component according to claim 1, wherein the data channel sequence correction unit also has N connection selection stages for selective, paired connection of the N memory devices with corresponding bridging lines and for selective selection of the memory devices, connected in a paired manner, with bridging lines dependent on the control unit.

4. The time/space coupling component according to claim 3, wherein the N connection selection stages have N/2 input multiplexers and N/2 output multiplexers.

5. The time/space coupling component according to claim 1, wherein respective selection stages constitute multiplexers.

6. The time/space coupling component according to claim 1, wherein the control unit includes M control stages.

7. The time/space coupling component according to claim 1, wherein the control unit controls the time coupling, space coupling and/or data channel correction units such that a chronological and spatial allocation of the plurality of data channels from N input lines to M output lines takes place in a first operating mode.

8. The time/space coupling component according to claim 7, wherein the N connection selection stages and the N bridging selection stages are deactivated.

9. The time/space coupling component according to claim 1, wherein the control unit controls the time coupling, space coupling unit and/or data channel sequence correction units such a that a correction of a data channel sequence and a spatial allocation of the plurality of data channels from N input lines to M output lines takes place in a second operating mode.

10. The time/space coupling component according to claim 9, wherein the N connection selection stages are deactivated and the N bridging selection stages are activated.

11. The time/space coupling component according to claim 1, wherein the control unit controls the time coupling, space coupling unit and/or data channel sequence correction units such way that a correction of the data channel sequence and a chronological and spatial allocation of the plurality of data channels from N/2 input lines to M output lines takes place in a third operating mode.

12. The time/space coupling component according to claim 11, wherein the N connection selection stages activated and the N bridging selection stages are deactivated.

* * * * *